April 29, 1930.  W. P. VOTH  1,756,265
MOLD
Filed Aug. 18, 1926   2 Sheets-Sheet 1

INVENTOR.
WALTER P. VOTH.
BY
ATTORNEY.

April 29, 1930.  W. P. VOTH  1,756,265
MOLD
Filed Aug. 18, 1926  2 Sheets-Sheet 2

Patented Apr. 29, 1930

1,756,265

UNITED STATES PATENT OFFICE

WALTER P. VOTH, OF AKRON, OHIO, ASSIGNOR TO THE AKRON STANDARD MOLD COMPANY, OF AKRON, OHIO, A CORPORATION OF OHIO

MOLD

Application filed August 18, 1926. Serial No. 129,903.

The present invention relates to a new and improved form of curing ring for the curing of pneumatic tires, and particularly to a mechanism for dispensing with the usual "rimming up" process, as it is known in the art. The invention is shown as combined and associated with the usual form of "watchcase" vulcanizer, but the principles of the invention may be applied to other forms of molds as will be understood by those skilled in this art.

In the manufacture of pneumatic tires, it is customary to insert an air bag within the tire casing and to mount the air bag and the tire upon a curing ring, the complete assembly being placed in the mold for vulcanization. The operation of assembling these elements is known as "rimming up" and it is the purpose of the present invention to devise an improved form of mold which will dispense with the rimming up operation. It is one of the objects of the invention, further, to combine with a watchcase type of vulcanizer, the mechanism shown and described by which the tire and air bag may be quickly and accurately placed within the vulcanizer before closing.

These and other objects will be apparent to those skilled in the art to which this invention appertains, and while the description and drawing is quite detailed, as is necessary for a complete understanding of the invention, changes and modifications may be made within the scope and purview of the invention as set forth in the claims.

In the drawings:

Figure 4 is an enlarged section of a portion of the vulcanizer, tire and curing ring.

Figure 1:
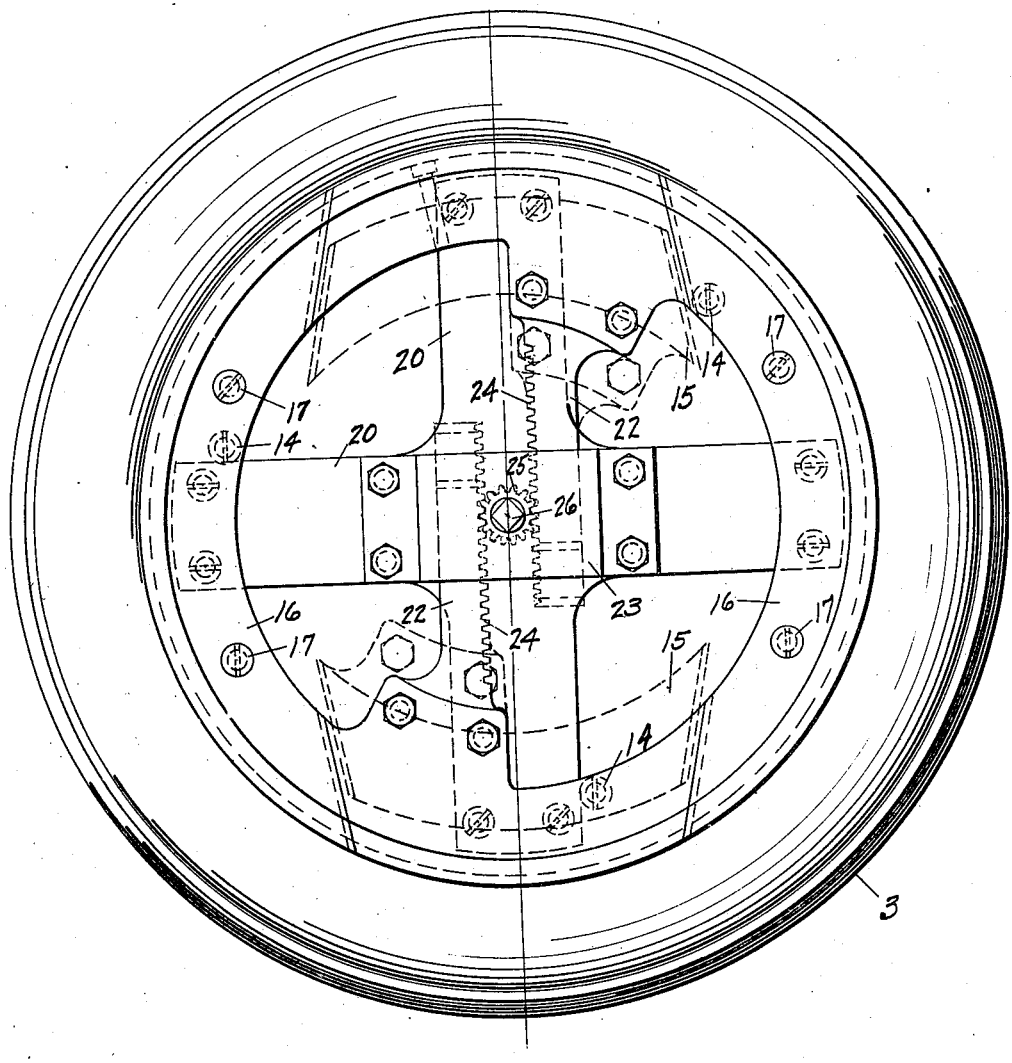
Figure 1 is a side elevation of a mold plate with the new and improved type of curing ring therein.
Figure 2:
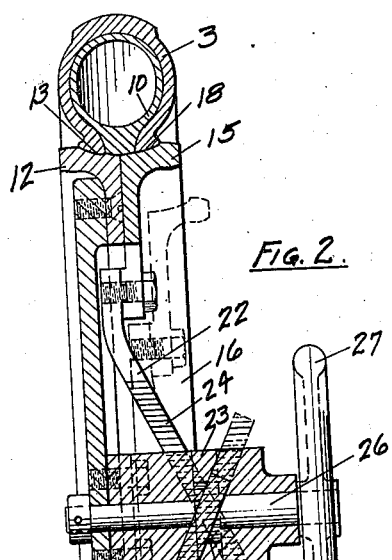
Figure 2 is a vertical section through the curing ring removed from the mold or vulcanizer.
Figure 3:
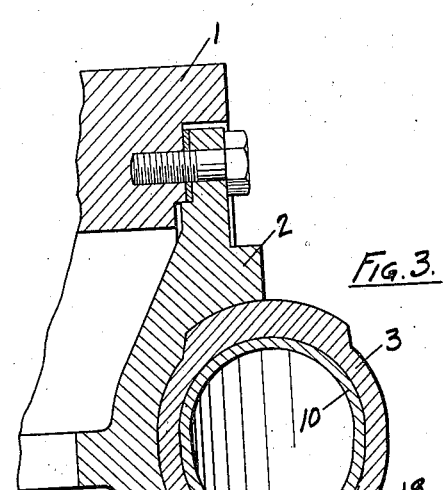
Figure 3 is a cross-section of a complete watchcase vulcanizer unit with the new form of curing ring in position.

Referring to Figure 3, the watchcase vulcanizer shown therein comprises a central, stationary or main section 1, which is chambered for the circulation of steam or other heating medium, the sides of the section 1 being closed in by removable mold plates 2 at either side thereof, which are shaped on their outer surfaces to receive one side of a pneumatic tire casing 3 which contains the usual air bag or expansible core 10.

To the stationary mold member are hinged movable or swinging sections 4 which are hollow also and are closed in by removable plates 5 which complete the tire cavities at either side of the vulcanizer. The movable sections are clamped together during vulcanization by rotatable clamping rings 6, as is well known in the art. Further details of the apparatus need not be described as they do not have anything to do with the present invention.

The curing ring is made in two sections or parts divided along a central plane. One of the sections, indicated at 12, is in the form of a solid ring, the outer surface of which is formed with a seat 13 for the reception of one of the tire beads. The ring 12 is held against the stationary section by any suitable attaching means, here illustrated as long screws 14.

The other half of the curing ring is formed in four segments, two movable segments 15, placed opposite to one another, and two stationary segments 16, secured to the ring 12 and to the vulcanizer by screws 17. The four segments 15 and 16 together form a ring complementary to the ring 12 when in expanded position, having a seat 18 for the reception of the opposite tire bead.

To the fixed ring 12 is secured the arms of a spider 20, at the center of which is located a suitable form of collapsing mechanism for drawing the movable segments 15 inwardly. This form of collapsing mechanism may be of any suitable type, but it is preferred that one be employed which will move the segments 15 in a diagonal plane toward and from final position, this action being desirable to draw the beads of the tire inwardly. The reason for moving the segments in a diagonal line is that the tire may normally stand outwardly somewhat as indicated at dotted lines in Figure 4, and this action will catch the beads of the tire and move them inwardly as shown.

To permit the withdrawal of the movable segments, they are preferably tapered outwardly as shown. Each segment is attached to a rigid arm 22 which is directed in an angular relationship to the plane of the tire, the arms therefore crossing at the center of the tire but being located on opposite sides of the center thereof. The arms are guided in a block 23 at the center of the tire and the sides of the arms are provided with rack teeth 24 which mesh with a pinion 25 carried by a shaft 26 rotatably mounted in the block 23 and carrying a hand wheel 27 for rotation. Any suitable aperture may be provided in the ring for the reception of the valve stem.

The operation of the apparatus will be understood from the description which has been given. The tire with the air bag located within it is placed in position on the ring 12 and upon the stationary ring sections 16, the movable segments 15 having first been withdrawn. The segments 15 are then moved outwardly and the tire beads are forced in position. The mold is then closed and locked and vulcanization may proceed.

It will be observed that a very simple and easily operated device has been provided by means of which the tire and air bag may be forced directly in the vulcanizer without the preliminary rimming up process. This makes an easier and cheaper method of handling tires in the factory and is quicker and better than the prior practices. The number and arrangement of the movable segments may be varied and other collapsing mechanism may be substituted for that specifically shown and described.

What is claimed is:

1. An apparatus for vulcanizing tires, comprising a mold and a curing ring, a portion of the ring being rigidly attached to the mold and another portion of the ring being movable toward and from its position in the complete ring.

2. An apparatus for vulcanizing tires, comprising a mold and a curing ring divided along a central plane into two sections, one of the sections being a complete ring attached to the mold and the other section being divided into a plurality of segments, and means for withdrawing certain of said segments to a position within the ring.

3. A curing ring divided along a central plane into two sections, one of the sections being segmental, and means for moving a segment toward and from the center of the ring.

4. A curing ring having a seat for the reception of a tire bead, the ring being formed in segments, two of which are movable and placed opposite to one another, in combination with a mold to which the other ring segments are permanently attached, and collapsing mechanism for withdrawing the movable sections.

5. A curing ring having a seat for the reception of a tire bead, the ring being formed in segments, two of which are movable and placed opposite to one another, in combination with a mold to which the other ring segments are permanently attached, and collapsing mechanism for withdrawing the movable sections in a direction diagonal to the plane of the ring.

6. A curing ring divided along a central plane into two sections, each having a seat for a tire bead on its outer periphery, one of the sections being segmental, and means for moving a segment of the ring toward and from the center thereof.

7. A curing ring divided along a central plane into two sections, each having a seat for a tire bead on its outer periphery, one of the sections being segmental, and means for moving a segment of the ring toward and from the center thereof in a direction diagonal to the plane of the ring.

8. An apparatus for vulcanizing tires comprising a mold, a curing ring permanently attached thereto and forming a seat for the tire beads and air bag, a segment of the ring being movable toward and from the circular position in a direction diagonal to the plane of the ring.

9. An apparatus for vulcanizing tires, comprising a mold, and a curing ring carried thereby and forming seats for the tire beads and air bag, the ring being divided into sections along a central plane, one of the sections being a one-piece ring fixed to the mold, the other section being divided into segments, one of which is fixed to the mold and the other movable toward and from the center thereof.

10. An apparatus for vulcanizing tires, comprising a mold, and a curing ring carried thereby and forming seats for the tire beads and air bag, the ring being divided into sections along a central plane, one of the sections being a one-piece ring fixed to the mold, the other section being divided into segments, one of which is fixed to the mold and the other movable toward and from the center thereof in a direction diagonal to the plane of the ring.

11. An apparatus for vulcanizing tires, comprising a mold, and a curing ring carried thereby and forming seats for the tire beads and air bag, the ring being divided into sections along a central plane, one of the sections being a one-piece ring fixed to the mold, the other section being divided into four segments, two of which are fixed to the mold and the other two movable toward and from the center thereof.

12. In apparatus for vulcanizing tires, comprising a mold, and a curing ring carried thereby and forming seats for the tire beads and air bag, the ring being divided into sections along a central plane, one of the sections being a one-piece ring fixed to the mold, the other section being divided into four segments, two of which are fixed to the mold and the other two movable toward and from the center thereof in a direction diagonal to the plane of the ring.

13. A vulcanizer for pneumatic tires comprising a stationary vulcanizer section and a movable vulcanizer section, a curing ring carried by the stationary section to receive and support a tire in alignment with the mold, flanges along the sides of the curing ring adapted to engage the beads of the tire, the curing ring being formed in segments, and means to move a segment toward and from the axis of the ring.

14. A vulcanizer for pneumatic tires comprising a stationary vulcanizer section and a movable vulcanizer section, the sections being adapted to be brought together to form a vulcanizing cavity, a curing ring lying between the sections and enclosing the cavity about its inner periphery, a support for the curing ring secured to the stationary section whereby the ring is adapted to receive and support a tire in alignment with the mold, the curing ring having a movable segment, and means carried by the support for moving the said segment toward and from the axis of the ring.

15. A vulcanizer including a stationary section and a movable section, each of said sections containing complementary molding cavities, a flanged curing ring lying between the sections about the inner periphery thereof, said ring being adapted to receive and support a tire in alignment with the mold, the curing ring being formed in segments, certain of which are fixed, a support for the curing ring attached to the stationary section, and collapsing mechanism on said support connected to other of the segments and adapted to move the segments toward and from the axis of the ring, all of the segment moving mechanism being independent of the movable section.

16. A vulcanizer including a stationary section and a movable section, a curing ring located between the sections, said ring being adapted to receive and support a tire in alignment with the mold, the said ring being segmental, a segment being movable toward and from the axis of the ring and in the same plane therewith, and mechanism for moving the segment independently of the opening or closing movement of the movable section and operative to move the segment into position to complete the ring or to withdraw it therefrom while the vulcanizer sections are open.

17. A vulcanizer including a stationary section and a movable section, a segmental curing ring located between the sections and having flanges to engage the beads of the tire and a centrally located groove to constitute a seat for an air bag, and support the tire and air bag in alignment with the mold, a segment of the ring being movable toward and from the axis of the ring, and mechanism for moving the segment independently of the opening or closing movement of the movable section and operative to move the segment into position to complete the ring or to withdraw it therefrom while the vulcanizer sections are open.

WALTER P. VOTH.